United States Patent [19]
Williams

[11] Patent Number: 5,839,673
[45] Date of Patent: Nov. 24, 1998

[54] APPARATUS FOR GRINDING MATERIAL

[76] Inventor: Robert M. Williams, 16 La Hacienda, Ladue, Mo. 63124

[21] Appl. No.: 711,532

[22] Filed: Sep. 10, 1996

[51] Int. Cl.[6] .................................................... B02C 23/26
[52] U.S. Cl. .............................. 241/48; 241/31; 241/33; 241/79.1
[58] Field of Search ................................ 241/31, 33, 48, 241/65, 66, 79.1, DIG. 14

[56] References Cited

U.S. PATENT DOCUMENTS

| | | | |
|---|---|---|---|
| 1,882,329 | 10/1932 | Kreisenger | 241/48 X |
| 3,477,650 | 11/1969 | Williams | 241/47 |
| 3,610,694 | 10/1971 | Williams | 241/31 |
| 3,794,251 | 2/1974 | Williams | 241/48 X |
| 3,912,015 | 10/1975 | Garbee et al. | 241/31 X |
| 4,055,307 | 10/1977 | Williams | 241/48 |
| 4,061,274 | 12/1977 | Williams | 241/48 X |
| 4,226,371 | 10/1980 | Williams | 241/31 |
| 4,245,570 | 1/1981 | Williams | 241/48 X |
| 4,461,428 | 7/1984 | Williams | 241/34 |
| 4,498,633 | 2/1985 | Williams | 241/48 |
| 4,541,572 | 9/1985 | Tamura et al. | 241/33 X |
| 5,439,181 | 8/1995 | Williams | 241/79.1 |

FOREIGN PATENT DOCUMENTS

| | | | |
|---|---|---|---|
| 201966 | 3/1955 | Australia | 241/33 |
| 286753 | 2/1991 | Germany | 241/DIG. 14 |

*Primary Examiner*—Andrea L. Pitts
*Assistant Examiner*—Julie A. Krolikowski
*Attorney, Agent, or Firm*—Polster, Lieder, Woodruff & Lucchesi, L.C.

[57] ABSTRACT

Apparatus for grinding material which enters the grinder in a wet condition and is subject to drying heat at the grinder to leave moisture in the ground material directed for independently material separation so the propelling initially hot gases looses its temperature level before returning to the grinder. A portion of the returning gases carrying ground fine with moisture therein is directed into a bag house to recover the fines and a portion of the drying heat is directed into the bag house to independently maintain a temperature level above the dew point temperature level in the bag house to prevent moisture from plugging the bag house. The apparatus provides two circulation loops, each with its independent moisture control, and a common transport for collecting product from each loop.

5 Claims, 1 Drawing Sheet

APPARATUS FOR GRINDING MATERIAL

BACKGROUND OF THE INVENTION

This invention is directed to apparatus for grinding material for use in many different commercial activities which include blast furnaces, where the material has a desired degree of moisture. In the use of moisture containing oversize ground material for supplying a blast furnace the result is that the ground particles will explode when it hits the blast furnace environment due to the moisture content thus reducing the oversize particles to a more useful size.

When injecting coal into a blast furnace it is desirable to leave about five percent (5%) moisture in that coal. When the moisture containing coal is injected into a blast furnace it will explode and be reduced to the desired size. To reach the desired moisture level in the coal, it is necessary to grind coal containing about fifteen percent (15%) moisture. Thus the object is to be able to reduce the temperature so it exits from a mill at a temperature varying in the range of 170° to 190° which is too hot to be able to leave a moisture content of about five (5%) percent in the coal. If the grinding temperature is lowered, the effect is to reach the dew point in a bag house so the bag house plugs due to excess moisture.

To overcome the plugging off a bag house, hot gas from a furnace needs to be by passed from reentering the mill so it enters the bag house to raise the temperature in the bag house above the dew point while operating the grinding mill at a temperature level that allows grinding coal material having a moisture content of about fifteen (15%) percent.

A preferred apparatus includes a system having a material reducing rotary mill in a circuit with a cyclone separator and a primary air circulating fan in the circuit to return the carrier fluid from the cyclone separator back to the mill. To control the grinding of wet material, a source of heat is developed so that heat can be introduced from a furnace so that oxygen in the system can be consumed to reduce the atmosphere in the system to an inert or low oxygen condition whereby the system atmosphere is rendered incapable of supporting an explosion or fire.

A controlled volume of fresh air is admitted so the furnace operation is just sufficient to avoid inefficiency which is about at the point where furnace operation is at or near the point where all or nearly all of the oxygen is consumed. Ordinarily, the furnace outlet temperature under control of the admission of fresh air oxygen would be of the order of 2000° F., but due to the recycling of part of the exhaust from a bag house the furnace output temperature is reduced to about 900° F. It is preferred to operate the system with control over the amount of fresh air entering the furnace to be related to the exhaust to the outside to render the atmosphere in the entire system inert.

In a preferred apparatus, moisture containing material is introduced to a reducing mill, and the mill output is processed through a cyclone separator to return the moving air to the mill, whereby outside atmospheric pollution is reduced by a secondary separator in the form of a bag house. The bag house performs a function of reducing pollution while operating at a temperature level above the dew point to prevent plugging which would render the apparatus inoperative. To accomplish this operation, a control over the exhaust to the exterior from the bag house is reduced so a portion of the bag house exhaust is bypassed to join with fresh air entering the system at the furnace. The oxygen is that fresh air supports combustion so the entire system becomes inert.

The preferred system operates under a negative pressure so that any leaks will be inward to avoid air pollution problems. Also, the system is operated in a manner to discharge ground product from a grinding mill having a desired moisture content, while avoiding any tendency to have bag house temperature at the dew point in the secondary separator which is a bag collector.

BRIEF DESCRIPTION OF THE DRAWING

With the foregoing principles of operation in mind, attention will now be directed to the apparatus depicted in the drawing which is a schematic view of a system that is applied to the components making up the apparatus.

DETAILED DESCRIPTION OF THE APPARATUS

Figure 1:
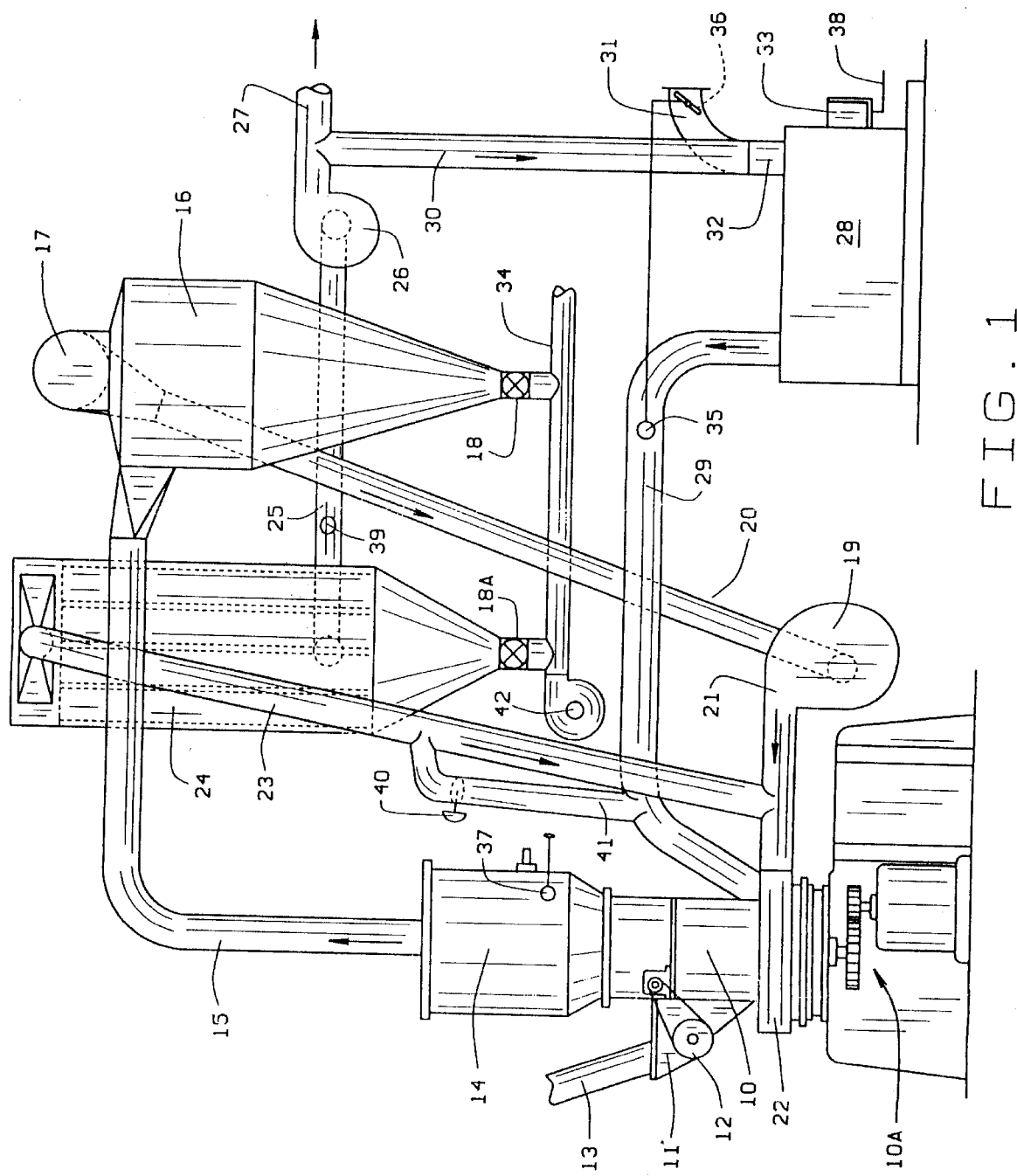

In the view of the drawing there is an arrangement of a rotary material reducing or grinding mill 10 having a material feed inlet 11 equipped with a rotary inlet valve 12 which admits material having a moisture condition of the order of about 15% from an external source represented by a conduit 13. The mill is provided with a motor driven transmission assembly 10A. The mill has a particle separator housing 14 which discharges desired particles size material and returns oversize to the mill 10. The material discharge from the mill is conducted by conduit 15 to the top of a cyclone separator 16 where the propelling gaseous medium is collected at the housing 17 while the solid material drops down and is released through a rotary valve 18. The gaseous transport medium collected at housing 17 is directed into a circulating fan 19 by conduit 20 where the gaseous medium is directed through an outlet 21 to enter the mill 10 at the bustle 22 to again transport the ground material back to the separator 14 and around to the cyclone 16 to complete a loop which includes the mill 10, cyclone 16 and fan 19.

The apparatus seen in the drawing includes a second circulating loop which includes a conduit 23 connected between the fan outlet 21 and the top of a bag house 24 and an outlet conduit 25 which is the outlet from the bag house to an exhaust fan 26 which has an outlet 27 to atmosphere.

The secondary loop in the apparatus includes interconnecting the exhaust fan 26 through a heat source furnace 28 so the heat can be directed by conduit 29 into the bustle 22 at the mill 10. The furnace 28 has a conduit 30 to act as a bypass from the exhaust fan 26 into the furnace to allow the furnace to control the oxygen content supplied by a fresh air inlet fitting 31 connected into a mixing box 32 at the furnace 28. A fuel supply burner 33 is part of the furnace 28. The furnace is operated to consume oxygen so the entire apparatus is rendered inert while the effect of the exhaust fan 26 maintains the apparatus under a negative pressure so that leakage is inward.

The apparatus above described is intended to process incoming material having a moisture content of the order of about 15% and to deliver ground material from the cyclone outlet rotary valve 18 and the bag house outlet rotary valve 18A through a common outlet conduit 34 in which that material has a moisture content of about 5%. The conduit 34 is provided with a fan 42.

The control over the temperature aspects of the system so that there is no plugging of any of the operating components, is by a simple almost direct acting control provision incorporated in the following manner: Maintenance of an internal inert oxygen level is suitably obtained by an oxygen sensitive unit 35 in the furnace outlet stack 29 to provide for adjusting fresh air inlet valve 36 in inlet conduit 31. Thereby the admission of fresh air can be adjusted with the gaseous medium bypassed from the fan 26 in conduit 30.

Concurrently, the heat from the furnace 28 raises the temperature in the mill separator 14. That temperature level is sensed at unit 37 which is connected into a responsive fuel supply means 33 at unit 38 at the furnace to maintain a desired temperature condition in conduit 15 of the order of about 170° to 190° F. As the flow of the ground material is carried into the cyclone, the gaseous carrier medium flows to the fan 19 and part enters conduit 23 to flow into the bag house 24. To prevent the temperature reaching the dew point in the bag house 24, the secondary loop embodies a bypass 41 which supplies heated air from conduit 29 into conduit 41 for the purpose of raising the bag house temperature above the dew point.

The prevention of a bag house dew point condition is obtained by a temperature sensing unit 39 being placed in the bag house outlet conduit 25 and the unit 39 controls a valve 40 placed in the bypass conduit 41 to adjust that valve 40 to admit heated inert furnace gas from conduit 29 to the conduit 23. This control 39 constantly responds to the flow out of the bag house to maintain that temperature above the dew point so that no plugging in the bag house can occur.

It can be understood that the exhaust flow from the fan 26 through the outlet 27 releases substantially non-polluting gases to the adjacent environment. The product accumulated in the cyclone 16 and bag house 24 is released at rotary valve 18 and 18A and directed to a transport conduit 34 for delivery to a blast furnace (not shown) or to whatever equipment requires that material. The conduit 34 is provided with a fan 42.

The principle of the foregoing disclosure is presented in connection with apparatus which may be varied to accomplish a similar purpose so as to include variations which fall within the scope of the invention.

What is claimed is:

1. In apparatus for grinding material the combination which comprises:
    a) a first material transporting circuit including a material grinding mill having a material receiving inlet, a ground material outlet connected into a material collecting cyclone separator, and circulating fan means connected to said cyclone separator and said mill to effect movement of ground material into said cyclone separator and return fluid means to said mill;
    b) a second transporting circuit connected between said circulating fan means and said mill, a bag house having an inlet for circulating fluid and an outlet for ground material fines, and an exhaust fan connected to said bag house and open to the exterior;
    c) heat supply means having an inlet connection to said exhaust fan and an outlet connected into said mill to supply heat to the material in said grinding mill; and
    d) bypass means connected between said heat supply means in advance of said mill and said bag house for introducing heat to said bag house for maintaining bag house temperature level above a dew point temperature in said bag house.

2. In the apparatus combination set forth in claim 1 wherein a first temperature control includes sensor means at said mill adjacent the material outlet therefrom and at said heat supply means to adjust a given temperature level in the material outlet from said mill.

3. In the apparatus combination set forth in claim 1 wherein the level of the temperature from said heat supply means to said mill is controlled by sensor mean between said heat supply means outlet and combustion air supply to said heat supply means.

4. In the apparatus combination set forth in claim 1 wherein a temperature level sensor means is in an outlet for fluid gas exhausted from said bag house and the bypass means introducing heat to said bag house to maintain the exhaust temperature above the dew point temperature in said bag house.

5. In apparatus for grinding material for use as a fuel when reduced by grinding, the combination which comprises:
    a) a material grinding mill, a cyclone ground material collector and a gaseous fluid fan connected into a first circuit in which the ground product from the mill is collected in the collector and the gaseous fluid is circulated and returned to the mill after substantial removal of the ground material;
    b) a bag house and a gaseous medium exhaust fan connected in a second circuit for extracting fines of the ground material from said first circuit and discharging the gaseous medium to atmosphere substantially free of atmosphere pollution, said second circuit having conduit means for a gaseous medium supply connection at said gaseous fluid fan for supply to said bag house;
    c) a heat source receiving combustion supporting air and discharge from said second circuit and directing heated fluid into said material grinding mill;
    d) heat bypass means connected between said conduit means connected into said bag house and a gaseous fluid return to said mill;
    e) control means including first control means to adjust the heat source to obtain a first level of heat in the ground product from the mill, a second control means to adjust the heat level at said bag house to maintain the level above the dew point in said bag house; and
    f) transport conduit means connecting said bag house and said collector for directing ground material and material fines to a common discharge.

* * * * *